Aug. 15, 1933.   L. A. ELMER   1,922,669
COUPLING DEVICE
Filed Jan. 25, 1930   2 Sheets-Sheet 1
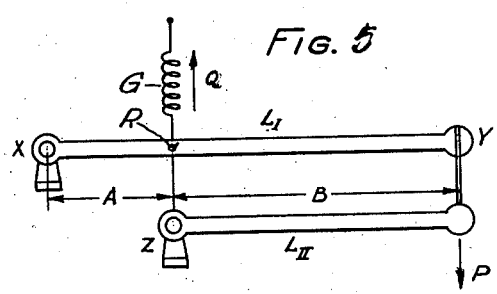
Fig. 5
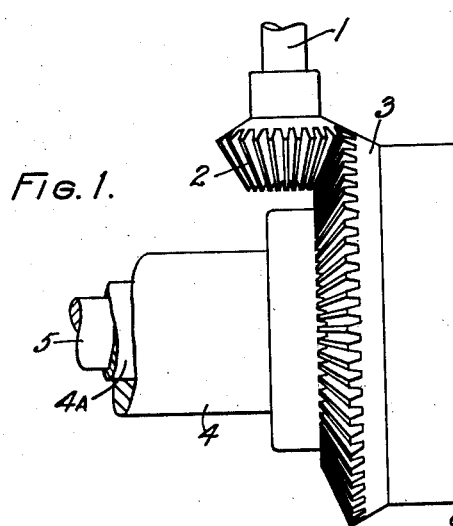
Fig. 1.
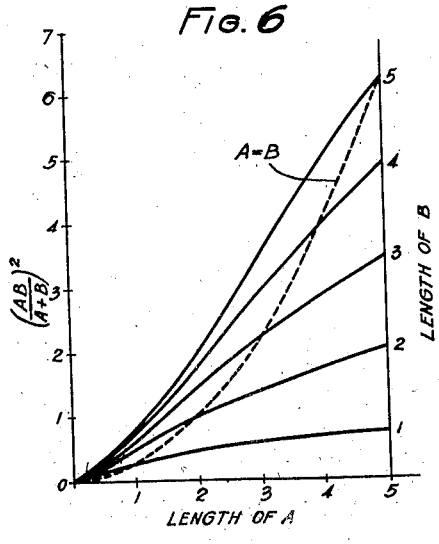
Fig. 6
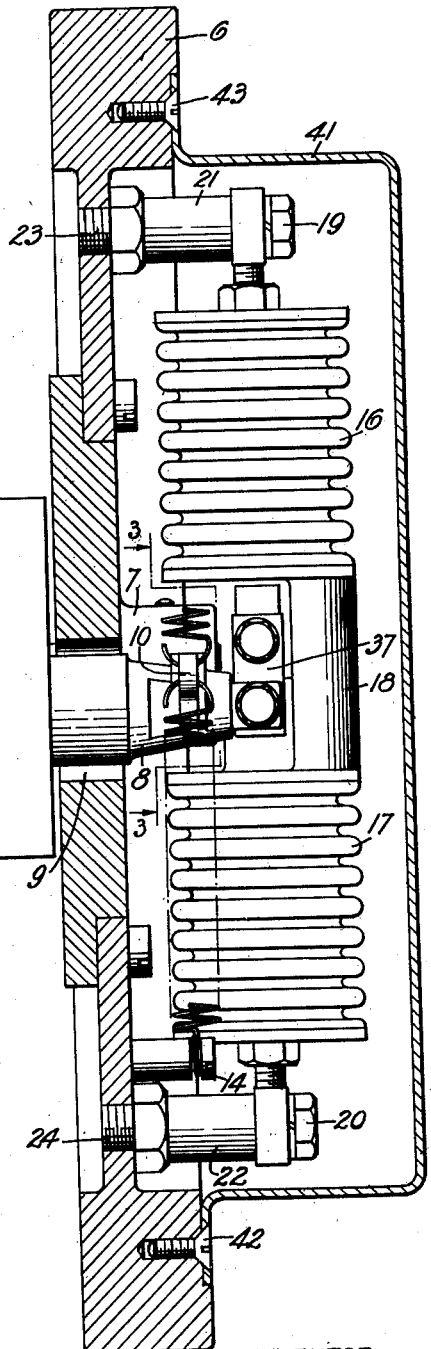
INVENTOR
L. A. ELMER
BY
G. H. Heydt.
ATTORNEY Aug. 15, 1933.    L. A. ELMER    1,922,669
COUPLING DEVICE
Filed Jan. 25, 1930    2 Sheets-Sheet 2
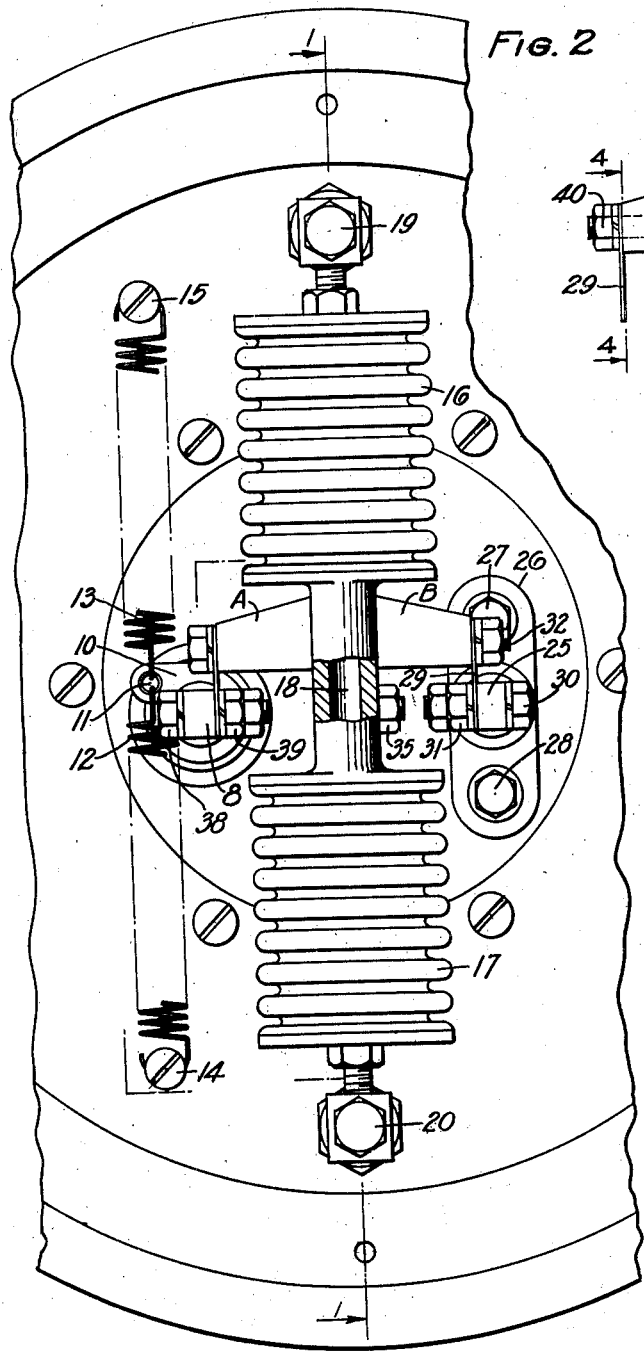
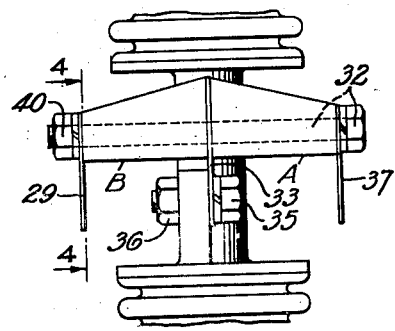
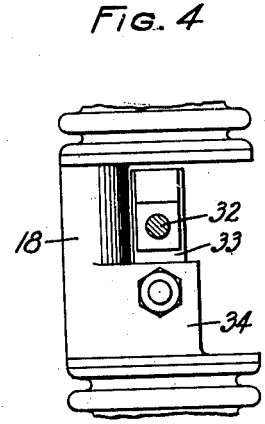
INVENTOR
L. A. ELMER
BY G. H. Heydt.
ATTORNEY Patented Aug. 15, 1933

1,922,669

UNITED STATES PATENT OFFICE 1,922,669

COUPLING DEVICE

Lloyd A. Elmer, West Orange, N. J., assignor to Bell Telephone Laboratories, Incorporated, New York, N. Y., a Corporation of New York Application January 25, 1930. Serial No. 423,363

8 Claims. (Cl. 64—100)

This invention relates to coupling devices and more particularly to such devices adapted to prevent the transmission of extraneous vibrations from the driving member to the driven member of a mechanical system.

This invention is embodied in an improved vibration absorbing coupling of the type disclosed in my U. S. Patent 1,778,756, issued October 21, 1931, wherein a fluid damped resilient filter in the form of a cylindrically enclosed bellows containing a fluid is connected to both the driving and driven members of a mechanical system.

In the vibration absorbing coupling disclosed in my earlier patent the cylindrical bellows is shown as connecting the driving gear and the driven phonograph turntable shaft of a sound reproducing machine. In this disclosure the bellows is placed eccentric to the axis of rotation of the driven shaft and by reason of its connection to both driving and driven members, is rotated therewith. This arrangement of the bellows is suitable for the use to which it is put as it is made primarily for a coupling between a phonograph turntable and the driving gear of a phonograph, or some other mechanical system wherein very low speeds are required. In mechanical systems requiring relatively higher speeds, for example, in driving the continuous feed sprocket of a sound film reproducing machine wherein it is desired to prevent the transmission of extraneous vibrations from the driving member to the driven sprocket, certain difficulties arise with the use of the bellows in the manner discussed above. The centrifugal force acting on this arrangement of the bellows when high speeds are attained tends to bend the bellows due to their own weight and the weight of liquid therein and thus introduce an unbalanced or eccentric weight which greatly reduces the efficiency of operation of the coupling.

The main causes for irregularities in the drive producing extraneous vibrations are, first, those introduced by lack of precision in cutting the gear teeth, and, second, shaft friction causing a variation in load on the flywheel. To overcome the first of these causes it is necessary to employ weak springs in the coupling to absorb such vibrations. To overcome the irregularities caused by shaft friction strong springs are required. Therefore, to compensate for both of these irregularities a compromise as to the strength of the coupling springs must be made. The best possible operation has been found to exist when the stiffness of the coupling member is adjusted to have a resonant frequency which is one-third of the speed of rotation of the drive. In cases where the speed of rotation is to be increased or if the coupling is to be used in a mechanical system operable at a speed of rotation higher than that for which it is adjusted, it will be necessary to increase the stiffness of the drive for the following reasons: Curves derived from a mechanical system of this type showing the relation between the effect of the forces applied to the flywheel as the speed of rotation is increased show that the irregularities caused by the errors in the shape of the gear teeth and such irregularities caused by shaft friction both decrease as the speed of rotation is increased. However, the effect of the error in gear teeth is decreased to a greater extent than the effect of the shaft friction. Therefore, if the compromise is to be maintained, that is, that the resonant frequency shall be one-third of the speed of rotation, the effect of the shaft friction must be decreased further. This, then, is accomplished by increasing the strength of the springs or bellows stiffness. It is therefore desirable to have some means provided whereby the stiffness of the coupling may be varied over a wide range of values, while employing the same bellows or spring member. In the drive disclosed in my earlier patent the effective stiffness of the bellows is determined by the distance of the axis of the bellows from the axis of the flywheel. In this case there is a certain minimum value below which it becomes impracticable to go because of the mechanical difficulties incident to the placing of the reed connectors at the center of the driven shaft. It has been determined that the ratio of the extreme stiffnesses possible with this arrangement is about 20 to 1. Any other degree of stiffness which might be desirable, but which lies without this range must be obtained by providing an entirely new and specially designed bellows member.

In accordance with the present invention there is provided a vibration absorbing coupling in which the cylindrical bellows are arranged concentrically about the axis of rotation of the shaft thereby eliminating the effect of centrifugal action, and in which a novel means is provided for varying the effective stiffness of the drive over a wide range of values with the same bellows member. This means comprises an adjustable lever arrangement disposed at the point of connection between the driving member and the bellows or coupling member.

Other features of my invention will appear in the following description, reference being made to the accompanying drawings, in which:

Fig. 1 is a section of the flywheel showing the coupling member mounted thereon, taken on line 1—1 of Fig. 2.

Fig. 2 is a plan view of the flywheel and coupling member with the flywheel cover removed.

Fig. 3 is a plan view of the lever arm connection between the bellows coupling member and the driving and driven members taken on line 3—3 of Fig. 1.

Fig. 4 is a view of the lever connecting member taken on line 4—4 of Fig. 3.

Fig. 5 is a schematic showing of the component parts of the coupling member for the purpose of mathematical analysis.

Fig. 6 is a showing of the curves representing the stiffness of the coupling member obtainable for different lengths of lever arms.

A driving shaft 1 has mounted thereon a bevelled gear 2 which meshes with a bevel gear 3. Bevel gears 3 is secured to a sleeve 4. The sleeve 4 is rotatably mounted on a phosphor bronze sleeve 4a within which is rotatably mounted a driven shaft 5. The sleeve 4a may be rigidly held by means of a set screw, to the base frame (not shown) of the machine on which the coupling member is used. The driven shaft is connected to the center of a flywheel 6 at the hub 7. Power is transmitted from the driving shaft to the driven shaft through the flywheel and a vibration absorbing coupling the details of which are included in the following description.

Mounted on the rear of bevel gear 3 and near its circumference is a stud 8 which projects through the flywheel at an opening 9. A lug 10 is secured to the stud 8. A hole 11 is provided in the lug to receive the ends of coil springs 12 and 13. The other ends of these springs are rigidly secured to the flywheel 6 by means of screws 14 and 15.

This spring made up of the two sections 12 and 13 is employed as the part of the coupling member which will supply the greater portion of the stiffness required. The remainder of the coupling which will provide the lesser portion of the stiffness required, and whose effective stiffness may be adjusted to different values, is connected in parallel to this spring and concentric with the axis of rotation of the driven shaft 5. This coupling member comprises two cylindrically enclosed bellows members 16 and 17 containing a fluid and joined by a connecting passageway 18 in which a suitable valve may be placed. The closed ends of the bellows are rigidly attached to the flywheel by means of cap screws 19 and 20 which fit into posts 21 and 22 which are in turn secured to the flywheel at 23 and 24.

A post 25 having flanged portions 26 is rigidly attached to the flywheel by screws 27 and 28. One end of a reed spring 29 is attached to this post by a bolt 30 and a nut 31. The other end of reed spring 29 is secured to one end of a metal bar B which has a hole therethrough to receive bolt 32. This member B forms one of the lever arms to be discussed more fully in connection with Fig. 5. A second reed spring 33 (Figs. 3 and 4) is secured at one end to flange 34, extending from the connecting passage 18, by means of a bolt 35 and nut 36. A third reed 37 is secured at one end to stud 8 by a bolt 38 and a nut 39. As shown in Fig. 4 the bolt 32 passes through the other end of reed 37, a metal bar member A, the end of reed 33, the member B and the reed 29. A nut 40 threaded on the end of bolt 32 holds the above members in alignment as shown.

A flywheel cover 41 is secured to the flywheel 6 by screws 42 and 43.

A force analysis of the members that determine the effective spring stiffness of the bellows will be described by reference to Fig. 5.

X represents the point of connection of the stud 8 to the outer end of lever arm A through reed 37.

R represents the point of connection of the bellows members to lever arms A and B through reed 33.

G represents the bellows members 16 and 17.

$L_I$ represents the combined lengths of lever arms A and B.

Y represents the point of connection of the post 25 with outer end of arm B through reed 29.

Z represents the point of connection of the flywheel with the driven shaft 5 at its hub 7.

$L_{II}$ represents the distance on the flywheel between the post 25 and driven shaft 5.

The stiffness or linear build-up of the spring G at R is equal to "S" where $$S = \frac{Q}{d_1} = \frac{\text{Pull in pounds on } G}{\text{Deflection in inches at } R}$$

Taking moments about X, the counter-clockwise moment $Q \times A$ = clockwise moment $P(A+B)$ in inch pounds, where P is the pull in pounds at Y. Therefore $$P = \frac{QA}{A+B}$$

Then the torque at $Y = Px$ lever arm length B or $$T_y = \frac{QA}{A+B} \times B$$

The linear deflection at any point on the lever is proportional to its distance from the fulcrum $$\therefore d_1 : A : : d_y : A+B$$

$$d_y = \frac{Q}{S}\left(\frac{A+B}{A}\right)$$

where $d_y$ is the deflection at Y.

Radians deflection at $$Y = \frac{\text{linear deflection at } Y}{B}$$

Radians deflection at $$Y = \frac{d_y}{B}$$

$$Y = \frac{\frac{Q}{S}\left(\frac{A+B}{A}\right)}{B}$$

Then the total stiffness in inch pounds per radian on $L_{II}$ taken as $$K = \frac{\text{Torque at } Y}{\text{Radians deflection at } Y} = \frac{\frac{QA}{A+B}B}{\frac{Q(A+B)}{S\ A}} = \frac{\frac{QAB}{A+B}}{\frac{Q(A+B)}{S\ A}} = \frac{A^2B^2}{(A+B)^2}S$$

$$K = \left(\frac{AB}{A+B}\right)^2 S$$

The S being constant for the same bellows member the stiffness K can, therefore, be determined by substituting values for the lever arm lengths A and B.

Fig. 6 shows a set of curves derived from the above equation by taking one lever arm length as constant and deriving the effective stiffness for increasing lengths of the other lever arm. The dotted line is a curve derived from the above equation when $A=B$ for all values. From this set of curves it can be seen that for any stiffness desired the corresponding lever arm lengths required may be readily ascertained. In practice the arm B is replaced by one of different length by moving and securing post 25 on the flywheel a greater or shorter distance from the hub 7 depending on the length of the replacing arm B.

It is therefore obvious that if the coupling is to be used with a mechanical system operable at a uniform speed of rotation differing substantially from that for which it is adjusted, it will be simply necessary to replace the lever arms by others of a length that will give the desired resulting stiffness without the need for replacing the entire bellows member.

What is claimed is:

1. In a mechanical transmission system, a rotatable driving member, a rotatable driven member, means coupling said members comprising a cylindrically enclosed bellows containing a fluid, and means to vary the effective stiffness of the coupling over a wide range of values, said means comprising a replaceable connection between said coupling means and said rotatable members.

2. In a mechanical transmission system, a rotatable driving member, a rotatable driven member, means coupling said members comprising a pair of cylindrically enclosed interconnected elastic members arranged symmetrically about the axis of rotation of said rotatable members, and means to vary the effective stiffness of said coupling means, said means comprising a replaceable lever arm connection between said coupling means and said rotatable members.

3. In a mechanical transmission system, a rotatable driving member, a rotatable driven member, means coupling said members comprising a cylindrically enclosed elastic member containing a fluid, and means associated with the connection between said coupling member and said rotatable members whereby the effective stiffness of said coupling member may be changed, said means comprising a pair of replaceable lever arm members, the outer end of one of said lever arms having a resilient connection to said driving member, the outer end of said other lever arms having a resilient connection to said driven member and the inner ends of both said lever arms having a resilient connection to said elastic coupling member intermediate its ends.

4. In combination with a mechanical transmission system having rotatable driving and driven members and means coupling said members comprising a pair of enclosed elastic members containing a fluid, each of said elastic members having one end attached to said driven member and means interconnecting the other ends of said elastic members, of means whereby the effective stiffness of said elastic member may be varied, said means comprising a pair of replaceable lever arm members, the outer end of one of said lever arms having a resilient connection to said driving member, the outer end of the other of said lever arms having a resilient connection to said driven member, and the inner ends of both said lever arms having a common resilient connection to said interconnecting means of said elastic members.

5. In a mechanical transmission system, a rotatable driving member, a rotatable driven member, vibration absorbing means coupling said members, and means to vary the effective stiffness of said coupling means, said means comprising a replaceable lever arm connection between said coupling means and said rotatable members.

6. In a mechanical transmission system, a rotatable driving member, a rotatable driven member, means coupling said members comprising a cylindrically enclosed elastic member containing a fluid, and means associated with the connection between said coupling member and said rotatable members whereby the effective stiffness of said coupling may be changed, said means comprising a pair of replaceable lever arm members, the outer end of one of said lever arms having a connection to said driving member, the outer end of said other lever arms having a connection to said driven member and the inner ends of both said lever arms having a connection to said elastic coupling member intermediate its ends.

7. In combination with a mechanical transmission system having rotatable driving and driven members and means coupling said members comprising a pair of enclosed elastic members containing a fluid, each of said elastic members having one end attached to said driven member and means interconnecting the other ends of said elastic members, of means whereby the effective stiffness of said elastic members may be varied, said means comprising a pair of replaceable lever arm members, the outer end of one of said lever arms having a connection to said driving member, the outer end of the other of said lever arms having a connection to said driven member, and the inner ends of both said lever arms having a common connection to said interconnecting means of said elastic members.

8. In a mechanical transmission system, a rotatable driving member, a rotatable driven member, vibration absorbing means coupling said members and means to vary the effective stiffness of said coupling means, said means comprising a pair of replaceable lever arm members, the outer end of one of said lever arms having a connection to said driving member, the outer end of said other lever arm having a connection to said driven member and the inner ends of both of said lever arms having a connection to said coupling means.

LLOYD A. ELMER.